United States Patent
Blanc et al.

(10) Patent No.: US 8,121,729 B2
(45) Date of Patent: Feb. 21, 2012

(54) REMOTE DIAGNOSTIC SYSTEM FOR ROBOTS

(75) Inventors: Dominique Blanc, Västerås (SE); Jean-Christophe Alt, Thionville (FR); Anders Ekelund, Göteborg (SE); Jessica Nymark, Billdal (SE); Steve Murphy, Hovås (SE)

(73) Assignee: ABB Research Ltd., Zürich (CH)

( * ) Notice: Subject to any disclaimer, the term of this patent is extended or adjusted under 35 U.S.C. 154(b) by 1041 days.

(21) Appl. No.: 12/068,922

(22) Filed: Feb. 13, 2008

(65) Prior Publication Data
US 2008/0247549 A1 Oct. 9, 2008

(30) Foreign Application Priority Data
Feb. 13, 2007 (EP) ..................................... 07102279

(51) Int. Cl.
*G06F 19/00* (2011.01)
*H04L 9/00* (2006.01)

(52) U.S. Cl. ........ 700/248; 700/108; 700/245; 702/184; 702/185; 380/277

(58) Field of Classification Search .................. 380/277; 700/108, 245, 248; 702/184, 185
See application file for complete search history.

(56) References Cited

U.S. PATENT DOCUMENTS

| | | | | |
|---|---|---|---|---|
| 6,058,307 A | * | 5/2000 | Garner | 455/428 |
| 6,317,788 B1 | * | 11/2001 | Richardson | 709/224 |
| 6,438,454 B1 | * | 8/2002 | Kuroki | 700/245 |
| 6,446,192 B1 | * | 9/2002 | Narasimhan et al. | 712/29 |
| 6,518,980 B1 | * | 2/2003 | DeMotte et al. | 715/762 |
| 6,532,401 B2 | * | 3/2003 | Tackett et al. | 700/245 |
| 6,732,191 B1 | * | 5/2004 | Baker et al. | 710/1 |
| 6,785,590 B2 | * | 8/2004 | Kasuga et al. | 700/245 |
| 6,795,778 B2 | * | 9/2004 | Dodge et al. | 702/34 |
| 6,882,962 B2 | * | 4/2005 | Aoyama | 702/185 |
| 7,130,769 B1 | * | 10/2006 | Allen et al. | 702/184 |
| 7,853,645 B2 | * | 12/2010 | Brown et al. | 709/203 |
| 2002/0163427 A1 | * | 11/2002 | Eryurek et al. | 340/500 |
| 2003/0023333 A1 | | 1/2003 | Birkle | |
| 2003/0163217 A1 | | 8/2003 | Nakamoto et al. | |
| 2004/0083010 A1 | * | 4/2004 | Nagata et al. | 700/1 |
| 2005/0010311 A1 | | 1/2005 | Barbazette et al. | |
| 2006/0206289 A1 | * | 9/2006 | Stake et al. | 702/184 |
| 2008/0247549 A1 | * | 10/2008 | Blanc et al. | 380/277 |

OTHER PUBLICATIONS

Molinari-Tosatti L; "The ABB flexible automation approach for developing new software tools dedicated to advanced manufacturing and servicing technologies" Industrial Electronics, 2002; pp. 46-51.
European Search Report—Jul. 18, 2007.

* cited by examiner

*Primary Examiner* — Thomas Black
*Assistant Examiner* — Wae Louie
(74) *Attorney, Agent, or Firm* — Venable LLP; Eric J. Franklin

(57) ABSTRACT

A remote diagnostic system for robots including a number of at least two robots, wherein a controller of each robot of the system is locally connected to a service unit provided with local processing power, a remote service center provided with a connector server is arranged, and a communications infrastructure for transferring packets of information between a controller of a robot of the system and connector server via the service unit is arranged for performing remote monitoring and diagnostics at the remote service center, wherein the communications infrastructure uses internet and/or GPRS communication lines.

32 Claims, 3 Drawing Sheets

REMOTE DIAGNOSTIC SYSTEM FOR ROBOTS

CROSS-REFERENCE TO RELATED APPLICATIONS

This application claims priority to European patent application 07102279.2 filed 13 Feb. 2007.

TECHNICAL FIELD

The present invention relates to a system of monitoring a plurality of robots spread at different locations at a remote service center by means of information exchange between individual robots and the remote service center.

BACKGROUND OF THE INVENTION

Common diagnostic systems for robot controllers consist of either a computational unit in the robot controller or diagnostics computations performed in a PC connected to the robot controller. Common to these existing solutions is the use of a high bandwidth of data signals that flow from the controller at the diagnostics computations. Diagnostics has conventionally been performed locally at the controller or at a device which has a high bandwidth connection to the controller.

US published application 2006/0206289 discloses a system of monitoring a plurality of robots from a remote location. The nature of the communication links used in said publication is not discussed.

OBJECT OF THE INVENTION

If, in a robot monitoring system, a remote service center is established to perform the monitoring of a high number of robots spread at a plurality of plants at different geographic locations, an optimization of communication traffic between each individual robot of the system and the remote service center plays a major role to enable delivery of cost effective services (diagnostics) to a customer. One object of the present invention is to present a solution of a remote diagnostic system for delivery of remote diagnostics for robots with minimal communications costs. Another object of the invention is to present a solution of a remote diagnostic system for delivery of remote diagnostics for robots with a safe and high security of the communications between the individual robots and the remote service center.

SUMMARY OF THE INVENTION

The present invention addresses problems in connection with communications and the localization of the computations in a remote diagnostic system for industrial robots. The present invention further addresses the issues directed to safety and security of the communications between a remote service center and industrial robots included in the system. One aspect of the invention is to provide each robot of the system with a service unit connected to the robot controller, wherein the service unit performs local diagnostic calculations and performs data compression. Said service unit is in turn connected to a remote connector server at a remote service center over a potentially low-bandwidth line or a line with high communication costs. The final or remaining diagnostics is performed at full computational power at said remote service center. Said remote service center further acts as a distribution point for information via a web browser and notification service, which allows e-mails and SMS-messages to be sent to the appropriate personnel at the robot site.

Two key features of the invention are adaptiveness and flexibility in the system. To achieve this, the service units are, e.g., reprogrammable. Another important demand on the system is security.

Locally in the system there is always at least one controller involved, normally close to an individual robot included in the system.

The service unit is a communication and logging unit, which has different degrees of processing power depending upon the design. The service unit is connected to the controller of the individual robot. The term "service unit" is herein only used as a term of identification. The functions included in the so called "service unit" can be implemented as a logic unit connected to and integrated with the robot controller. Said functions can as well be implemented as logics included in the controller or as a mix of logics internally and externally of the robot controller locally at the robot.

A first task for the service unit is to verify the product (the industrial robot) that is connected and explicate its version. A second task for the service unit is to request and/or receive commands from the connector server at the remote service center with respect to what to do. A third task for the service box is to executes scripts and/or codes provided by the connector server. The service box will react on events, condition changes from the robot or on specific requests from a user of the remote service center.

The connector server at the remote service center is provided with a code library storing codes for each specific service unit distributed across the remote diagnostic system. The connector server provides to the service unit codes/scripts on request from the service box or on demand from application performed at the connector server or from an end user.

The communications infrastructure is responsible for transferring packets of information, in both directions, between the locally disposed robot, here called the local site, and the remote service center, here sometimes referred to as the remote site.

An event scheme, wherein a service unit automatically requests diagnostic information from the remote service center, can be described as:

1° A service unit connects the connector server to request a code for operation.
2° The service unit gets access to a probe library at the connector server, which probes the robot controller with respect to such information as to version, performance etc. of the robot.
3° The service unit downloads a specific version of the code from a specific version library at the connector server for diagnostics and data gathering.

The communication between the service unit must be authorized and approved.

As communication between the local site and the remote site must be secure, there is presupposed that some form of an access point must be provided at both the local and the remotes sites. This access point can take the form of e.g. a VPN router or other piece of equipment allowing secure access to the remote service center.

The solution according to the invention solves a problem with diagnostic activities at a remote site. Controller data is very awkward, as it is very processor intensive. Such data would be difficult to transfer in a cheap way to a remote site. One purpose with the service unit is to provide compression of controller data. Another purpose would be to perform packing of data. Other aspects regarding the service unit is that it should be non-intrusive, generic and reprogrammable. These aspects are important to achieve the adaptiveness and the flexibility of the remote diagnostic system, which provides services and diagnostics to a large and non homogeneous robot population (i.e. a large installed base of different products and versions of robots).

As the controller data is compressed, possibly packaged and possibly pre-processed, cheap communication lines, such as internet or GPRS, can be used to arrive at a cost-effective system and thus enable the realization of the remote service center.

The remote service center could be viewed as a Global service center and is a central hub for the system. This hub clearly comprises a web site and servers for the web site, as well as a database for customer information. Depending upon the local site communicating with the remote service center, the hub may have diagnostic tools for performing diagnostics of a robot at said local site and other tools for remotely connecting to a robot controller via the service unit at a local site.

One object of the invention is to make it possible to provide robots without logics for monitoring purposes and in this way perform robots of a cheaper design. As the robot can communicate with the remote service center, monitoring tools, such as diagnostic units can be reached for performing said monitoring of the robot. In this way, the robot can get access to all monitoring and diagnostic tools available at the remote service center, wherein these tools are updated and of the latest design, which in turn make it unnecessary to provide the local robot controller with costly local diagnostic tools and a need of frequent robot software updates.

DESCRIPTION OF EMBODIMENTS

Below the invention will be explained in greater detail by description of embodiments with reference to the accompanying drawings.

The general architecture of the remote service center is structured to function as, among others, a central data storage with a web interface. A device logic layer will make the interface with customer equipment and will handle the communication between the servers and databases at the remote service center and the local site at the customer.

Figure 1:
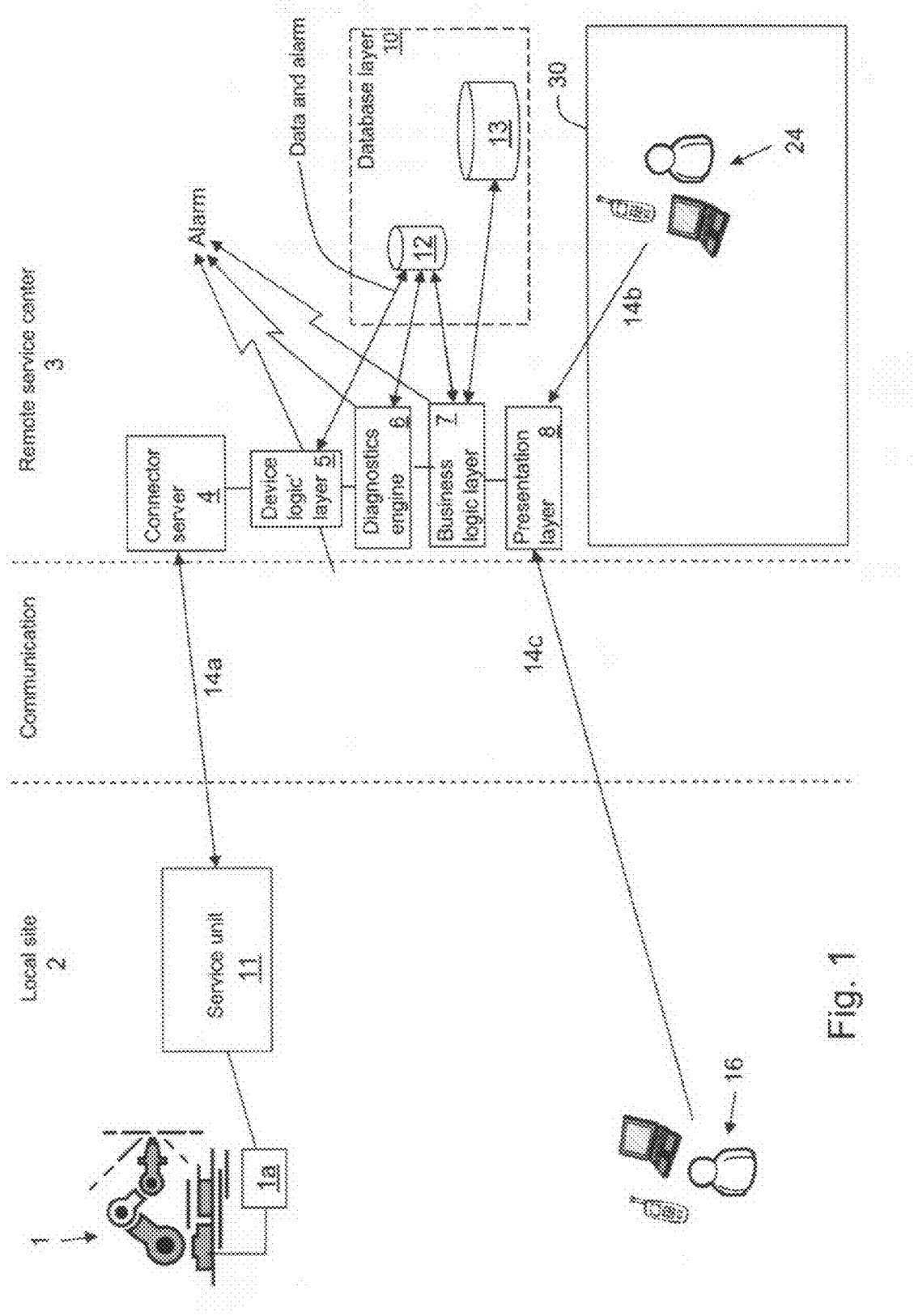
FIG. 1 is a basic schematic overview of the remote diagnostic system for robots according to one aspect of the invention.

FIG. 1 shows a brief overview of the remote diagnostic system for robots according to one aspect of the invention and is explained more in detail in the following. A robot 1 at a customer site, herein called a local site 2, depicted in the system represents only one of the plurality of robots that can be included at the local site in the system. The local site 2 further represents a plurality of local sites (at least two), which can be included in the remote diagnostic system.

In the system there is a robot services. Said robot services provide all the interfaces between the local site 2 and the remote service center 3. The robot services hide all the complexity and specificity of the communication and transform robot specific data to generic data for a transfer of information between the local 2 and remote sites 3.

At the remote service site 3 the robot services is represented by a box denoted 4, which can be realized as a client server, here represented as a connector server 4. The robot services, further, have one part at the local site (robot services client), herein referred to as a service unit and denoted 11, representing logics installed for the purpose, to handle the local process and events associated to the robot 1. The service unit 11 is connected to or integrated with the robot controller 1a, to which the service unit 11 is assigned. The connector server 4 performs scheduled services, such as requesting data from a local site 2 and reception of service data from a local site 2. Crypting and encrypting data on communication with a local site 2 is also implemented at the connector server 4. The connector server 4 can be implemented on one or more connector servers at the remote server center 3. In the robot services, including the service unit 11 and the connector server 4, the connector server 4 checks the authority of the service unit 11 its access to the remote service center 3. Said access could, as an example, be implemented as a digital signature for the service unit 11.

The connector server 4 further stores a code archive/library, which is provided with the codes applicable for all the service units 11 being authorized to access the connector server 4 for exchange of data via the communication line 14a. This is arranged, such that when a specific service unit 11 requests diagnostic information from the remote service center 3, the connector server 4 identifies said service unit 11 and retrieves from the code library the code for use at the specific service unit 11 and the connector server 4, whereupon said retrieved code is downloaded to the service unit 11. The connector server 4 can further be provided with software for pre-processing of data from the service unit 11 and software for management of said data. If data from the service unit is delivered to the connector server 4, the connector server 4 will be provided with software for de-packing data packets. The code is secured from tampering during the transmission and to prevent unauthorized code from being executed on the service unit 11. This can be accomplished by using a number of hash and encryption techniques, one common technique is to hash the code in the code library and then digitally sign the hash with a private key. A public key, using private/public key pairs, is in the service unit. When the code is downloaded, the service unit 11 checks the signature and the hash with the actual code, and refuses to run code that does not pass.

In a database layer 10 the remote service center 3 is further provided with a current history database 12, which contains all the information needed with respect to the requests of diagnostic information. The main information stored and managed are client user information (profile, site, robot type, robot variant, diagnostic date, contracts, mail etc.), communication information (local equipment, communication parameters, contracts, etc.) and administration information (security, rights, scripts, etc.).

The main purpose with the configuration database 12 is to have it provided with all information needed to have monitoring and diagnostics working, excluding all information coming from the robot 1 itself or from a support engineer, when there is a contract between a supplier of the remote service center and a client (customer) using the robot 1. An administrator user has to be defined to manage and set up this client user information.

Further, a historical database 13 is provided in the database layer 10 at the remote service center 3. The historical database 13 gathers all the information coming from the robot 1 system and other associated information from other actors and which needs to be kept for history or processing. The historical database can store customer related information, such as robot type, robot version, service performed, who the customer is, where the robot is situated, service program, etc.

The remote service center 3 is provided with a diagnostics engine 6 equipped with processors and software for performing qualitative diagnostic analysis. The diagnostics engine 6 has scheduled processes attached for generating diagnostics information based on raw material stored for the specific robot 1 and on information sent from the service unit 11 via the communication line 14a. Alarms may be generated based on the result of said scheduled diagnostic processes performed for said specific robot included in the system. An alarm depending on diagnostics can be sent to the current history database 12 for storing and/or sent as an alert denoted by arrow 21. The diagnostics engine 6 performs analyses, trendings and predictions regarding each robot of the system and stores knowledge and history regarding the robot.

A unit, herein called a business logic layer 7, contains business related logics for the company managing the remote service center 2. The purpose of the business logic is to separate the database access and presentation logic from the user interface. The purpose is further to manage, for example, which services to be delivered, how the services is delivered to a customer (alarm, send or not by email/SMS, and to which person or addressee to send).

A presentation layer (web site) 8 is provided for allowing end users (service technicians at a remote service center console 24) at the remote service center 3 to access, via a user interface on a network 14b at the remote service center 3, all information regarding the robot systems included in the remote service system as data per individual robot or per population of robots. Available robot system information includes data from the business logic layer 7, results achieved from raw data in the diagnostics engine 6, data from the databases 12 and 13 at the remote service center 3 and direct data from the service unit 11 or robot controller 1a.

A device layer 5 provides logic for the remote service center 3. This device logic layer 5 is the link between the connector server 4, the current history database 13, the history database 12, the diagnostics engine 6, the business logic layer 7 and presentation layer 8 and comprises routines for data presentation and commands. This device logic layer 5 has knowledge implemented to it about the robots 1 of the system and a complete behavior of the remote service center 3. The device logic layer 5 will also manage the scheduled operations of the service center 3.

Still further, the historical database 13 contains short term and long term information for current display, temporary processing or long term statistical information and reports. The historical database is scalable and managed professionally at the remote service center 3.

Figure 2:
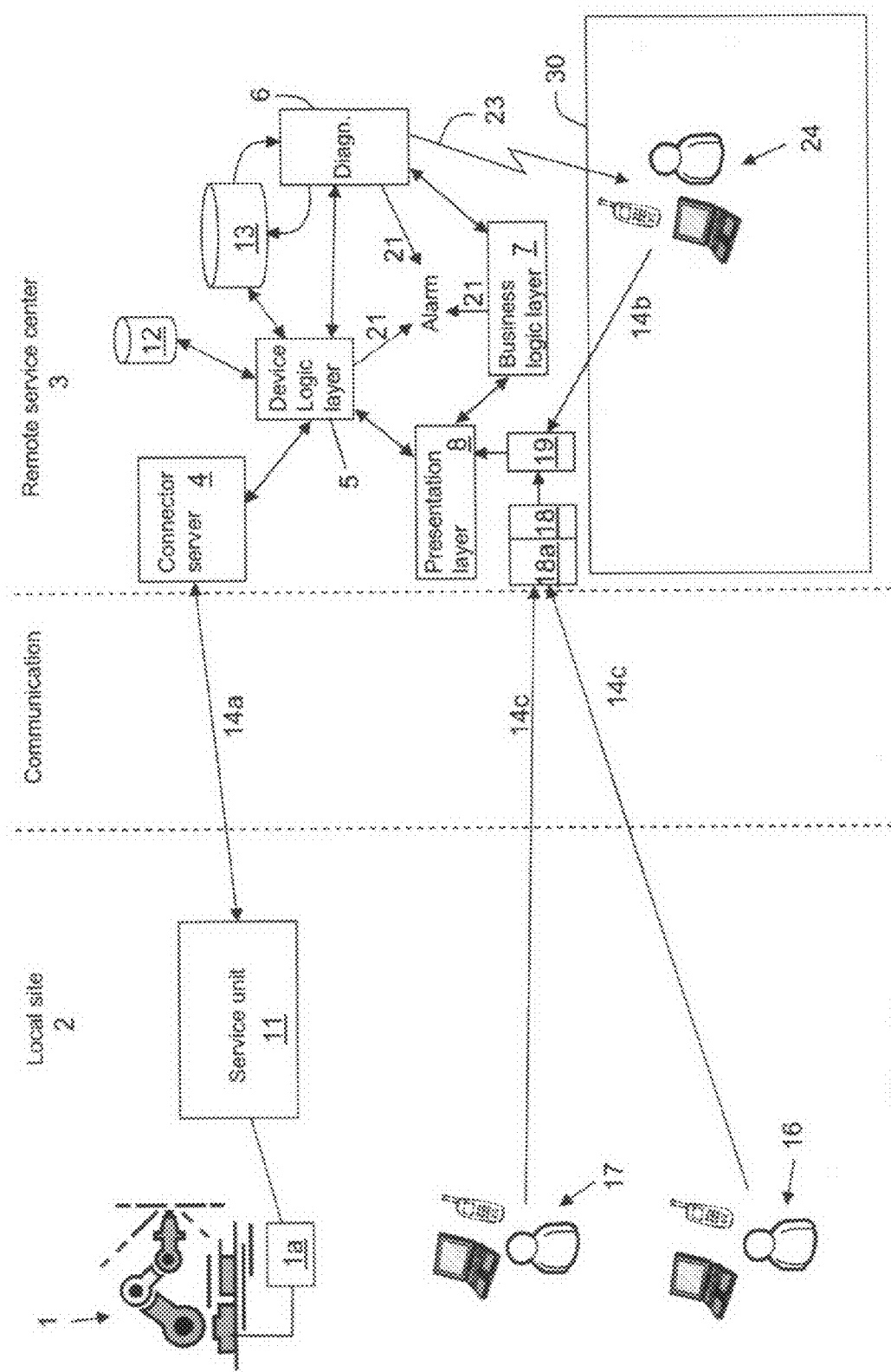
FIG. 2 shows a more detailed schematic overview of an embodiment of a remote diagnostic system according to FIG. 1.

A more detailed description of an embodiment of the remote service center is illustrated in FIG. 2.

The communication line 14a provides information in a dynamic way or through scheduled reports. The communication line 14a is also used for all the configuration and administrative functions. The communication line 14c is a communication channel for the end customer 16. By means of the communication line 14a it is also provided for access to the robots 1 in a secure way for the remote service center 3 to request information during events or on demand. Through the communication line 14a, the service unit 11 can e.g. be reprogrammed.

The remote service center 3 is further provided with a web portal 14c making it possible for service technicians 17 at the local site 2 to access the remote service center 3 and thus the databases 12 and 13 via a user interface.

The user interface is managed by the web portal 14c which is effected through a web client or a smart client. The same web portal 14c provides and manages information for different groups of users and must be secured.

In FIG. 2, the web portal 14c is indicated at arrows, which points at a web site presentation layer 8 at the remote service center 3. The web portal 14c access to the web site presentation layer 8 from the local site 2, when an end user, such as a local user (customer) 16 or a local technician 17 contacts the web portal server 19, is protected by use of a firewall denoted by 18. The web site presentation layer 8 handles, according to the example disclosed, the access from service technicians 17, 24, customer 16 through web portal server 19. Further, a customer web portal 18a is provided between the firewall 18 and the end users 16, 17. The web portal makes it possible to provide an end customer with a aal kind of complete robot information.

Some tools are attached to the web portal 14c to enhance the information displayed. These tools will be connected to raw data like logs or backups.

The device logic layer 5 is the link between the historical database 13, the current history database 12, the web site presentation layer 8 comprising routines for data presentation and commands, and the connector server 4. This device logic layer 5 has knowledge implemented to it about the robots 1 of the system and a complete behavior of the remote service center 3. The device logic layer 5 will also manage the scheduled operations of the service center 3.

The connector server 4 further handles events and data to interface these data with the data of the historical database 13 and the presentation layer 16 through the device logic layer 5.

Different alarms can be generated either by logics installed locally at the robot 1 at the local site 2 or originating from diagnostics performed at the remote service center 3. These alarms are centrally managed in the device logic layer 5 for sending alarm on events, track the alarm states, etc., in dependence of the instructions implemented in the monitoring service set up for the specific robot 1 installation. The alarm management service is implemented at the device logic layer 5, which can handle the alarm according to predetermined instructions. A direct line 23 for an alert to the remote service technician at remote service center console 24 is also implemented. The diagnostics performed at the diagnostics engine 6 can also be arranged, in dependence on results of the performed diagnostics, to release an alarm 23.

Diagnostic and service functions provided by diagnostics engine 6 are implemented as tools available for processing at the remote service center 3, e.g. from the historical database 13 to supply the service center 3 with qualitative diagnostic information and for performing advanced diagnostics and modeling.

Interactions performed at the remote diagnostic system for robots are illustrated in FIG. 2 and discussed further below. Services provided by the system can, as an example, be classified in three usage modes. In the modes presented, a service supplier center 30, preferably located at the remote service center 3, is pre-supposed. Said service supplier center 30 is provided with supplier personnel at a console for alerting personnel symbolized by the service technician at the service supplier center console 24, where said technician has access to all facilities of the remote service center 3 by means of console equipment, such as computers, displays, telephones, printers, faxes, etc.

In a first usage mode services are performed by the system when the robot 1 is working and running normally at the local site 2 without any report of an error. In this mode, at least one of the following monitoring actions are performed in the system, wherein the system:

monitors service information to generate an event on a detected failure.

gathers historical service information for future trouble shooting.

gathers statistical service information for predictive maintenance.

gathers usage information for reports.

saves backup data on demand (from customer or event) for recovery.

presents historical reports on the robot for the customer.

In a second usage mode services, the robot 1 has had a failure and the service supplier center 30 as well as the customer has been informed. In this mode the system performs at least one of the actions:

provides information on the failure to the service supplier center, provides historical service information before and at the time of the failure, provides on request from the service supplier center information for performing diagnostics of the failure, provides the service supplier center with additional tools for analyzing the failure based on raw data received from the robot 1.

provides the customer with information for display of current state of the robot 1.

In a third usage mode services, the robot 1 has experienced a major failure and cannot be recovered at the local site 2. In this third mode the system performs at least one of the actions:

informs the service supplier center 30, whereupon this service supplier center requests direct connection to the robot 1, the service supplier center 30 performs advanced analysis of the robot utilizing advanced analysis tools, the service supplier center 30 assists the customer 17 in manual operations utilizing remote assistance tools, the service supplier center 30 will recover the robot 1 utilizing archived backup, the service supplier center 30 will recover the robot 1 system, utilizing recovering tools.

the service supplier center 30 sets the service unit 11 into pass-through allowing direct remote access to the controller's 1a ports of a robot and then uses recovering tools and commands, a service unit 11 pass-through feature is used to deliver remotely advanced diagnostics and optimisation methods/services by analysing further robot signals from the controller 1a.

These modes are only examples and other modes of use of the system can be implemented.

Figure 3:
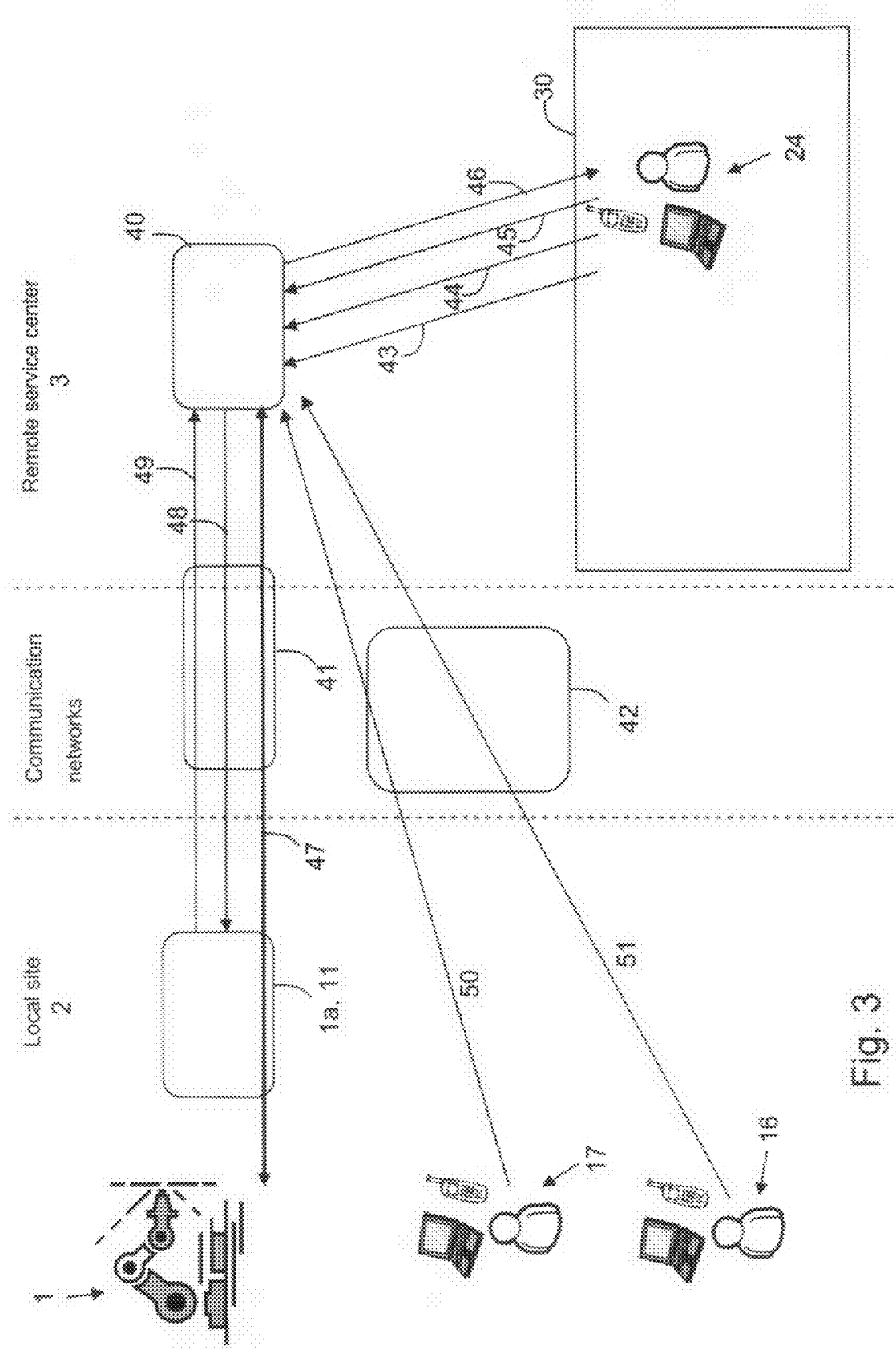
FIG. 3 is a schematic overview of communication possibilities in the remote diagnostic system of FIG. 1.

FIG. 3 schematically illustrates an overview of the communication possibilities of the remote diagnostic system of FIG. 1. Local equipment at the robot 1 site is denoted 1a, 11. The communications between the local site 2 equipment 1a, 11 and the remote service center 3 equipment is referred to as 40 and is illustrated to be relayed via a communications network 41. The communications between the local site 2, when represented by the local technician 17 and the customer 16, and the remote service center 3 equipment 40 is exemplified as internet and denoted 42.

The signal possibilities for a technician at the suppliers service center 30 are illustrated in the figure as:

43 operating diagnostic tools on raw data, 44 request available robot service information, 45 direct connection to robot 1 for recovery, 46 information reported from the system to the supplier's service center 30 containing information on occurring events (failure, started or ongoing) including related information.

Signal options between the local site 2 equipment and the remote service center equipment 40 via the communication network 41 are:

47 communication in both directions via a communication line for providing direct secured access to robot 1 from the remote service center 3.

48 the remote service center 3 requests data from the robot 1, 49 the remote service center 3 receives data from the robot 1.

A local service technician 17 sends or receives data via internet on line 50 of the figure.

A customer 16 receives data via internet on line 51 of the figure. The data contains local site information (current or historic).

The illustrated embodiment should only be referred to as an example. Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly stated here, that the servers and databases included in the remote service center 3 can be structured in other ways. As examples, the current history database 12 and the historical database 13 may, of course be housed in one unit only, or divided into more than two units. The servers included in the remote service center 3 may, in the same way, be integrated into one unit or distributed into several separate units.

The invention claimed is:

1. A remote diagnostic system for at least two robots, wherein each robot comprises a respective controller, the system comprising:

a plurality of service units, each of said plurality of service units connected to a respective one of the controllers, a remote service center comprising a diagnostics engine located at said remote service center for performing diagnostics on said robot, a connector server provided at the remote service center, which stores a code library for communication management between said connector server and each of said service units, each of said service units comprising local processing power and capable to receive and execute code downloaded from the connector server at the remote service center and for communication with said controller, a communications infrastructure for a communication between said service units and the connector server for transferring information for remote monitoring and diagnostics performed at said remote service center.

2. The remote diagnostic system according to claim 1, wherein each said service unit comprises reacting means for reacting on a request from said remote service center or an event, whereupon said reacting means downloads from said connector server a code or a script and for executing said code or script provided by said connector server.

3. The remote diagnostic system according to claim 2, wherein the event comprises a condition change of the robot reported from the connected controller.

4. The remote diagnostic system according to claim 1, further comprising:

secure communication means utilizing secure access points at both the local site and at the remote service center.

5. The remote diagnostic system according to claim 4, wherein the secure access points comprise a VPN router allowing secure access to the remote service center.

6. The remote diagnostic system according to claim 1, wherein each said service unit comprises algorithms for compressing or packing data for enabling cost-effective communication between said service unit and said remote service center.

7. The remote diagnostic system according to claim 1, wherein each said service unit comprises data measurement means and limited data diagnostics processing means for performing data measurements and diagnostics with respect to the robot connected to the service unit.

8. The remote diagnostic system according to claim 7, wherein a service technician at the local site and/or a customer at the local site has communication access to the layer device/logic via the web portal and a user interface.

9. The remote diagnostic system according to claim 8, wherein the web portal is effected through a web client or a smart client which is included in the presentation layer.

10. The remote diagnostic system according to claim 8, wherein the web portal is implemented in a web server provided with a firewall.

11. The remote diagnostic system according to claim 1, wherein each said service unit comprises a logic unit implemented separately from a controller situated device or implemented in a device integrated with the controller or implemented as logics included in the controller or as a mix of logics internally and externally of the controller of the robot.

12. The remote diagnostic system according to claim 1, wherein said remote service center serves as a hub of the remote diagnostic system and further:
   a current history database for storing information, a historical database for gathering information of the specific robot of the remote diagnostic system,
   a communication line for communication between the service unit and the remoter service center,
   a presentation layer, and
   a device logic layer serving as a link between the connector server, the current history database, the historical database and the presentation layer.

13. The remote diagnostic system according to claim 12, further comprising:
   an alarm management service linked to device logic layer and/or to said diagnostics engine and/or business logic layer for initiating an alarm upon predetermined instructions and/or results from said performed diagnostics.

14. The remote diagnostic system according to claim 12, wherein said diagnostics engine comprises diagnostic tools for performing diagnostics on at least one of:
   data stored in said historical database according to scheduled routines,
   data stored in said current history database according to scheduled routines,
   data stored in said historical database on request from the service unit, or
   data stored in said current history database on request from the service unit.

15. The remote diagnostic system according to claim 12, wherein the current history database comprises information storing means for storing data including administration data on the monitor of the robots in relation to a customer.

16. The remote diagnostic system according to claim 12, wherein the historical database comprises raw data collecting means for collecting raw data for the specific robot to be used for generating diagnostics in said diagnostics engine.

17. The remote diagnostic system according to claim 12, wherein the historical database comprises storing means for storing short term and long term data for current display or temporary processing or long term statistical information and reports for the specific robot.

18. The remote diagnostic system according to claim 12, wherein the device logic layer comprises routines for managing scheduled routines of the remote service center.

19. The remote diagnostic system according to claim 18, wherein the device logic layer comprises means provided with information regarding robots connected to the system and a complete knowledge of the configuration of the remote service center.

20. The remote diagnostic system according to claim 12, wherein the connector server comprises means for handling events and data for a specific robot for interfacing said events and data with the historical data associated with the specific robot stored in the historical database.

21. The remote diagnostic system according to claim 12, wherein the information stored in the current history database comprises client user information, communication information, administration information and current robot data.

22. The remote diagnostic system according to claim 1, wherein said remote service center comprises a suppliers service center including a remote service center console for a suppliers service technician browsing data of the remote service center.

23. The remote diagnostic system according to claim 22, wherein said diagnostics engine comprises diagnostic tools for performing diagnostics on at least one of:
   data stored in said historical database on request from the remote service center console, or
   data stored in said current history database on request from the remote service center console.

24. The remote diagnostic system according to claim 1, wherein the connector server comprises a list of signatures, each said signature identifying a service unit being authorized to access said remote service center.

25. The remote diagnostic system according to claim 1, wherein each said service unit comprises means for passing telnet, ftp, and other protocol connections directly from the connector server, or other units, in the remote service center to communication ports on the robot controller.

26. A method for remotely performing diagnostic analysis of robots, the method comprising:
   performing with a plurality of service units on request from a remote service center or initiated by a condition change at the robot assigned to a respective one of said service units at least one of the steps of:
   verifying to said remote service center data of the connected robot,
   requesting from the remote service center a code or a script for execution at the service unit,
   transferring to the remote service center a signature for getting access to the remote service center, or
   checking an authorization of a code or script received from the remote service center.

27. The method according to claim 26, wherein in a first usage mode when a monitored robot works normally, the system performs diagnostics using a diagnostics engine according to at least one of:
   monitoring service information to generate an event on a detected failure,
   gathering historical service information for future trouble shooting, gathering statistical service information for predictive maintenance, gathering usage information for reports, saving backup data on demand for recovery, or presenting historical reports on the robot for a customer.

28. The method according to claim 26, wherein in second usage mode applied when the robot has experienced a failure, the system performs diagnostics using a diagnostics engine according to at least one of:

providing information on the failure to a service supplier center, providing historical service information before and at the time of the failure, providing on request from the service supplier center information for performing diagnostics of the failure, providing the service supplier center with additional tools for analyzing the failure based on raw data received from the robot, providing the customer with information for display of current state of the robot.

29. The method according to claim 26, wherein in a third usage mode applied when the robot has experienced a major failure and cannot be recovered at a local site, the system performs diagnostics using a diagnostics engine according to at least one of:

informing a service supplier center, whereupon this service supplier center requests direct connection to the robot via the service unit, the service supplier center performs advanced analysis of the robot utilizing advanced analysis tools, the service supplier center assists a customer and/or a local service technician in manual operations utilizing remote assistance tools, the service supplier center recovers the robot utilizing archived backup, the service supplier center recovers the robot, utilizing recovering tools, the service supplier center sets the service unit into pass-through allowing direct remote access to the controller's ports of a robot and then uses recovering tools and commands, or a service unit pass-through feature is used to deliver remotely advanced diagnostics and optimization methods/services by further analyzing robot signals transferred directly from the controller.

30. The method according to claim 26, further comprising: programming said service unit from said remote service center.

31. The method according to claim 26, further comprising:

securing said code from being tampered with during a transmission and preventing unauthorized code from being executed on the service unit by assigning a hash to the code in a code library and digitally signing the hash with a private key to create a signature, and downloading said code to the service unit only after a check performed indicating that the signature is correct.

32. The method according to claim 23, wherein the data of the connected robot comprises type, model, serial number, or variant.

* * * * *